US008831502B2

(12) United States Patent
Kohara et al.

(10) Patent No.: US 8,831,502 B2
(45) Date of Patent: Sep. 9, 2014

(54) IMAGE FORMING APPARATUS WITH DUAL OPERATING LOCATIONS

(75) Inventors: Tasuku Kohara, Kanagawa (JP); Takashi Inoue, Saitama (JP); Kazuo Koike, Kanagawa (JP); Kenichi Yamada, Kanagawa (JP); Taisuke Omi, Kanagawa (JP); Tsuyoshi Endoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 991 days.

(21) Appl. No.: 12/222,075

(22) Filed: Aug. 1, 2008

(65) Prior Publication Data

US 2009/0060612 A1 Mar. 5, 2009

(30) Foreign Application Priority Data

Sep. 4, 2007 (JP) ................................ 2007-228874

(51) Int. Cl.
*G03G 15/00* (2006.01)
*H04N 1/04* (2006.01)
*G03G 21/16* (2006.01)

(52) U.S. Cl.
CPC ........ *G03G 15/6502* (2013.01); *G03G 15/5016* (2013.01); *G03G 21/1614* (2013.01); *G03G 2215/00016* (2013.01)
USPC ............. 399/367; 399/81; 399/107; 399/392; 358/498

(58) Field of Classification Search
USPC ......... 399/181, 367, 369, 373, 374, 107, 392, 399/81; 358/498; 355/97
See application file for complete search history.

(56) References Cited

U.S. PATENT DOCUMENTS

| | | | | |
|---|---|---|---|---|
| 6,023,342 | A * | 2/2000 | Yanagida | 358/1.15 |
| 6,819,891 | B2 * | 11/2004 | Suzuki | 399/81 |
| 7,180,628 | B1 * | 2/2007 | Motohashi et al. | 358/1.9 |
| 7,362,418 | B2 * | 4/2008 | Yasuda | 355/97 |
| 2005/0105930 | A1 * | 5/2005 | Sakai et al. | 399/82 |
| 2006/0055986 | A1 * | 3/2006 | Yasuda | 358/474 |

(Continued)

FOREIGN PATENT DOCUMENTS

| | | |
|---|---|---|
| JP | 06-003881 | 1/1994 |
| JP | 2000-214731 | 8/2000 |

(Continued)

OTHER PUBLICATIONS

Office Action dated Jan. 10, 2012, in corresponding Japanese Application No. 2007-228874.

*Primary Examiner* — Matthew G Marini
*Assistant Examiner* — Justin Olamit
(74) *Attorney, Agent, or Firm* — Harness, Dickey & Pierce, PLC

(57) ABSTRACT

The height of an image reading unit or an operating panel in an image forming apparatus is adjusted to facilitate their operation depending on the physical characteristics of a user, such as his height or use of a wheel chair. A second operating panel and a second automatic document feeder (ADF) are disposed on the side of the image forming apparatus, so that a user on a wheel chair can access them easily. The second ADF houses plural sheet trays that are configured to open or close together. When the sheet trays are closed, a first operating panel disposed at the top of the apparatus is activated while the second operating panel on the side is deactivated. When the sheet trays are open, the second operating panel is activated while the first operating panel is deactivated.

19 Claims, 7 Drawing Sheets

(56) References Cited

U.S. PATENT DOCUMENTS

| | | | |
|---|---|---|---|
| 2007/0059032 | A1 | 3/2007 | Yamada et al. |
| 2008/0089017 | A1 | 4/2008 | Yamada et al. |
| 2008/0199201 | A1 | 8/2008 | Kohara et al. |
| 2009/0201527 | A1 | 8/2009 | Yamada et al. |

FOREIGN PATENT DOCUMENTS

| | | | | |
|---|---|---|---|---|
| JP | 2004-040627 | | | 2/2004 |
| JP | 2004040627 | A | * | 2/2004 |
| JP | 2005-010394 | | | 1/2005 |
| JP | 2005-099567 | | | 4/2005 |
| JP | 2005-300872 | | | 10/2005 |
| JP | 2005-326527 | | | 11/2005 |

* cited by examiner

IMAGE FORMING APPARATUS WITH DUAL OPERATING LOCATIONS

BACKGROUND OF THE INVENTION

1. Field of the Invention

The present invention generally relates to image forming apparatuses having an image reading unit for reading an original manuscript image or an operating panel for entering operation instructions and the like. More particularly, the invention relates to the installation of an image reading unit or an operating panel in an image forming apparatus in a manner accommodating users with various bodily characteristics, such as different heights or the use of a wheel chair, to provide enhanced user-friendliness.

2. Description of the Related Art

In recent years, there has been a steady increase in barrier-free environments in public facilities, work places, houses, and various other places. The demand for barrier-free access is also felt in not just buildings but also in household appliances and information equipment used in buildings. With the changes in social structure that have been made over the years, including the increasing participation of people with disabilities in society, there is a demand for user interface designs for devices and equipment installed at public facilities or workplaces that are friendly to physically disabled persons.

In the currently available office automation (OA) equipment, such as copy machines, printers, facsimile machines, multifunction peripherals, and other image forming apparatuses, the height of their operating units are designed on the basis of someone of average height, and the height is typically fixed. As a result, some users feel that the operating unit is inconvenient because the unit is located too high or when the user is on a wheel chair, for example.

In order to deal with this problem, Japanese Laid-Open Patent Application No. 2000-214731 discloses an image forming apparatus having an elevator unit for lifting or lowering the apparatus main body, so that the height of the image forming apparatus as a whole can be adjusted. Japanese Laid-Open Patent Application No. 06-003881 discloses that an operating panel alone can be height-adjusted. Japanese Laid-Open Patent Application No. 2005-010394 discloses that both an operating panel and an ejected sheet tray can be height-adjusted.

While these technologies enable the height of the operating panel to be adjusted, it is also necessary, when using an image forming apparatus, to achieve enhanced operability in terms of the height of an original manuscript stage of an image reading unit on which an original manuscript is placed. Japanese Laid-Open Patent Application No. 2005-099567 discloses that the image reading unit is separated from the image forming apparatus main body, and a height adjustment mechanism is provided for the image reading unit. Japanese Laid-Open Patent Application No. 2005-300872 discloses that the height of both an image reading unit and an operating panel can be adjusted.

Other conventional technologies for making the operating panel easier to use include a tilting mechanism for changing the installed angle of the operating panel.

However, with regard to the aforementioned technology according to Japanese Laid-Open Patent Application No. 2000-214731, the need to lift or lower the entire image forming apparatus results in an increase in the cost and size of the elevator mechanism, which in turn leads to an increase in the size and cost of the image forming apparatus.

In the conventional technologies according to the rest of the publications mentioned above, although the height adjustment mechanisms enable vertical adjustment, the downward movement is limited. Namely, the operating panel cannot be positioned lower than the total height of sheet cassettes, an image forming unit, and the image reading unit due to the physical configuration of the image forming apparatus. Particularly, it has been difficult for wheel-chair users to make sure that an original manuscript has been correctly placed on the original manuscript stand of the image reading unit, or to operate the operating panel while monitoring information displayed thereon. Thus, a need has been felt for improving the convenience of the operating panel and the image reading unit.

SUMMARY OF THE INVENTION

It is therefore a general object of the present invention to provide an image forming apparatus in which the aforementioned problems are eliminated. A more specific object is to provide an image forming apparatus in which the height of an image reading unit and an operating panel is adjusted in order to facilitate their operations depending on the physical characteristics of a user, such as his height, or the use of a wheel chair.

In one aspect, the invention provides an image forming apparatus comprising a first image reading unit disposed at an upper portion of a main body of the image forming apparatus; and a second image reading unit disposed at a lateral portion of the apparatus main body. The second image reading unit includes a unit configured to establish a first state for transporting an original manuscript for image reading, and a second state for transporting a transfer sheet that is manually fed for image formation by the apparatus main body.

In a preferred embodiment, the second image reading unit has an automatic transport function for transporting the original manuscript for image reading and includes a first tray unit for placing the original manuscript prior to image reading, and a second tray unit into which the original manuscript after image reading is ejected. The first and the second tray units can be set in a stored state in which the first and the second tray units are closed toward the surface of the apparatus main body on which the second image reading unit is mounted, or in an image-reading state in which the first and the second tray units are opened away from the mounted surface. At least one of the first and the second tray units can be set in a third state that differs from either the stored state or the image-reading state, for transporting the transfer sheet that is manually fed.

In another preferred embodiment, the first and the second tray units are configured to open or close in a corresponding manner.

In another preferred embodiment, the image forming apparatus further comprises an operating unit disposed near each of the first and the second image reading units and configured to exchange information with the apparatus main body.

In another embodiment, the operating units are operated in a mutually exclusive manner depending on the operating status of the first and the second image reading units.

BRIEF DESCRIPTION OF THE DRAWINGS

These and other objects, features and advantages of the invention will be apparent to those skilled in the art from the following detailed description of the invention, when read in conjunction with the accompanying drawings in which.

DETAILED DESCRIPTION OF THE PREFERRED EMBODIMENTS

In the following, an embodiment of the invention is described with reference to the drawings.

Figure 1A:
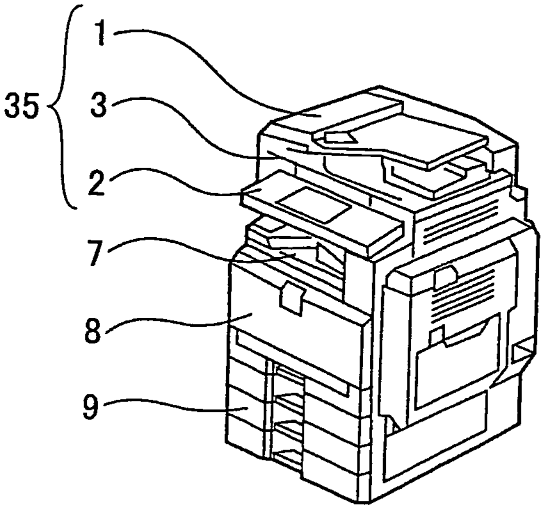
FIG.1A (Conventional Art)
FIG. 1A is a perspective view of a conventional image forming apparatus.

FIG. 1A is a perspective view of a conventional image forming apparatus including an upper unit 35. The upper unit 35 includes an automatic document feeder (ADF) 1 for sending an original manuscript to a scanner unit, an operating panel 2 as an operating unit for exchanging information with an apparatus main body, and a scanner 3 for reading the original manuscript. The image forming apparatus further includes a printer 8 (which is built inside the main body and thus invisible in the drawing) for outputting an image, an ejected sheet tray 7, and a sheet feeding tray 9.

As shown in FIG. 1A, the apparatus main body comprises, from the bottom, the sheet feeding tray 9 (which has four stacks in the drawing), the image forming unit (printer 8), the ejected sheet tray 7 (which may not be present, depending on the type of the apparatus), the image reading unit (scanner 3), and the ADF 1.

Figure 1B:
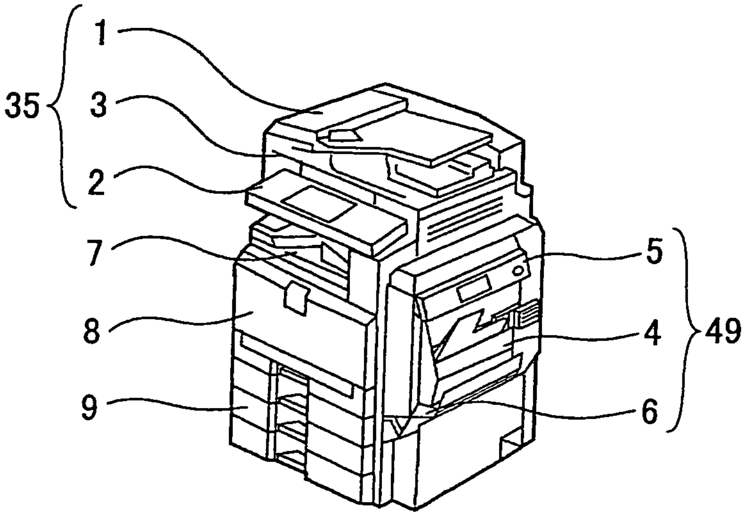
FIG. 1B is a perspective view of an image forming apparatus according to an embodiment of the present invention in which a lateral unit is provided.

FIG. 1B shows an image processing apparatus according to an embodiment of the invention. In this image processing apparatus, a lateral unit 49 that includes a second ADF 4, a second operating panel 5, and a second scanner 6 is disposed on the side of the apparatus main body to enable a user to operate the image reading unit including the ADF and the operating panel at a low position.

Figure 2A:
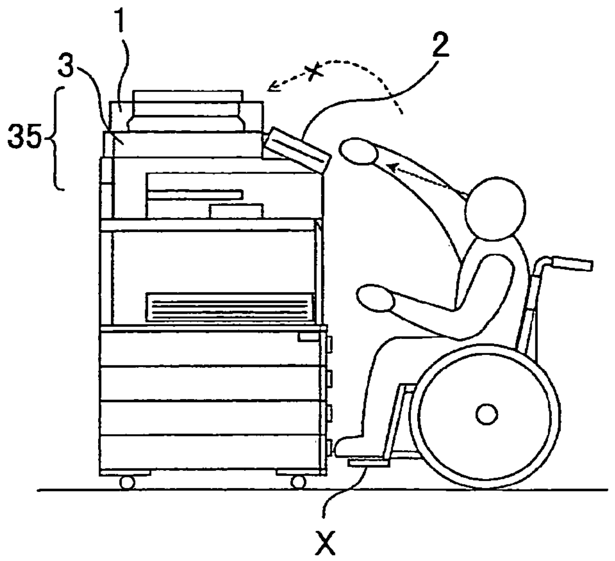
FIG.2A (Conventional Art)
FIG. 2A shows a user A on a wheel chair trying to operate the conventional image forming apparatus of FIG. 1A.

FIG. 2A illustrates how a user A on a wheel chair typically operates the conventional image forming apparatus of FIG. 1A. Because of the presence of the user's legs (the foot-rest portion X of the wheel chair), the user A has difficulty accessing the upper unit 35, such as the ADF 1, the operating panel 2, and the scanner 3. Thus, the user A is faced with problems such as that he cannot place an original manuscript easily, read the information displayed on the operating panel 2, or operate the operating panel 2.

Figure 2B:
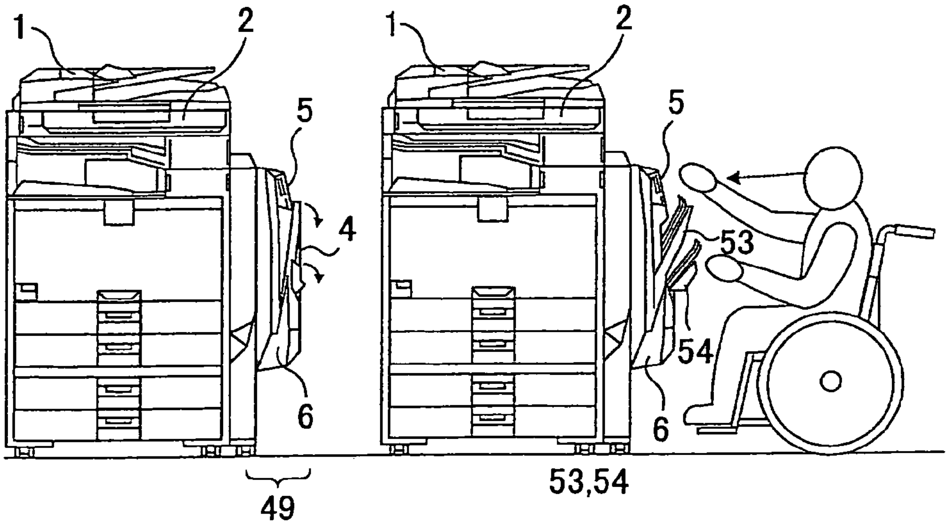
FIG. 2B shows the user A on a wheel chair using the image forming apparatus equipped with the lateral unit according to the embodiment of FIG. 1B.

In accordance with the present embodiment, the lateral unit 49 including the second ADF 4, the second operating panel 5, and the second scanner 6 is positioned on the lateral surface of the image processing apparatus (see FIG. 1B). The height of an operating range for the upper unit 35 may be approximately 110 to 120 cm, whereas the height for the lateral unit 49 may be approximately 65 to 80 cm. Thus, a user without a wheel chair can operate the upper unit 35 in the conventional way, i.e., looking downward when operating the operating panel 2 or setting an original manuscript on the ADF 1. On the other hand, when the user A on the wheel chair operates the lateral unit 49, as shown in FIG. 2B, the user A can see the second operating panel 5 directly in front of his eyes, or set an original manuscript on the second ADF 4 looking downward. Thus, the operation is greatly facilitated for the user A on the wheel chair.

With reference to FIG. 2B, the lateral unit 49 includes sheet trays 53 and 54. The sheet trays 53 and 54 are normally housed within the second ADF 4 and are opened only when used. When one of the sheet trays 53 and 54 is opened (or closed), the other tray is automatically and correspondingly opened (or closed). When the sheet trays 53 and 54 are closed, the operating panel 2 of the upper unit 35 is activated while the second operating panel 5 of the lateral unit 49 is deactivated in order to prevent an erroneous operation. When the sheet trays 53 and 54 are open, the second operating panel 5 is activated while the upper operating panel 2 is deactivated, assuming that the second ADF 4 and the second scanner 6 on the side are going to be used.

Figure 3:
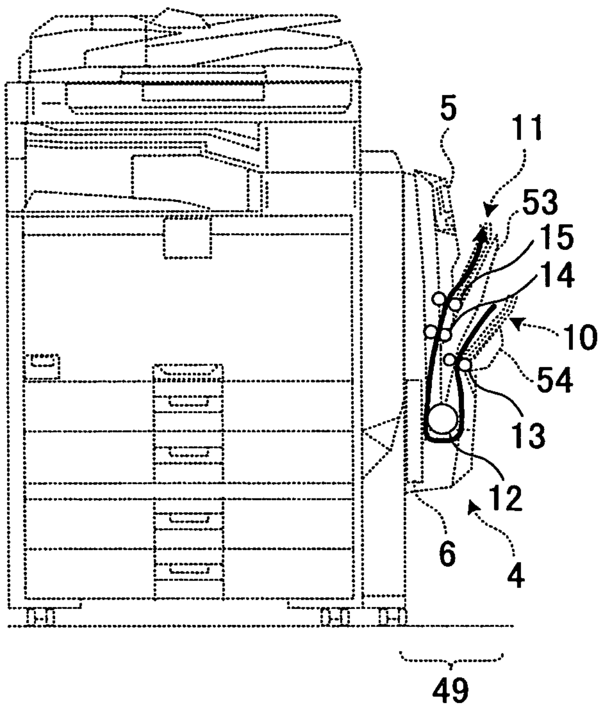
FIG. 3 shows an ejection path for an original manuscript sheet transported by a second ADF in the lateral unit.

FIG. 3 shows a sheet ejection path along which an original manuscript is transported by the second ADF in the lateral unit 49. In the second ADF 4, the original manuscript sheet prior to entry into the second scanner 6 is placed at a first position 10. After the sheet is read by the second scanner 6, the sheet is positioned at a second position 11. The original manuscript sheet is thus transported between the first position 10 and the second position 11 by an ejection roller 12 and first through third ejection roller pairs 13, 14, and 15, along which the original manuscript is read by the second scanner 6 and information that is read is rendered into electronic information (first state).

With reference to FIG. 3, the sheet ejection path in the case of a one-side reading of the original manuscript sheet is described. The sheet is transported from the first position 10 via the first ejection roller pair 13. At the ejection roller 12, the original manuscript is read by the second scanner 6 and the information that is read is rendered into electronic information. The sheet is then transported via the second ejection roller pair 14 and the third ejection roller pair 15 to the original manuscript second position 11.

Figure 4E:
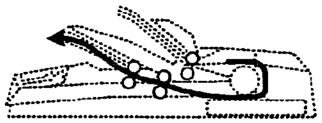
FIG. 4E shows a fifth state of the original manuscript sheet in the ejection path.
Figure 4D:
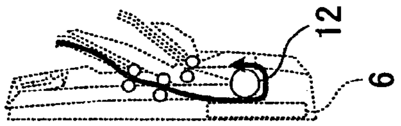
FIG. 4D shows a fourth state of the original manuscript sheet in the ejection path.
Figure 4C:
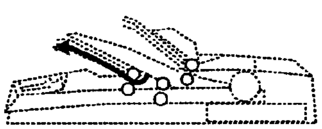
FIG. 4C shows a third state of the original manuscript sheet in the ejection path.
Figure 4B:
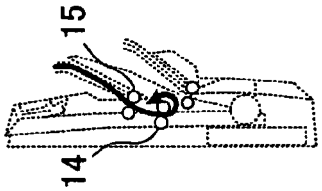
FIG. 4B shows a second state of the original manuscript sheet in the ejection path.
Figure 4A:
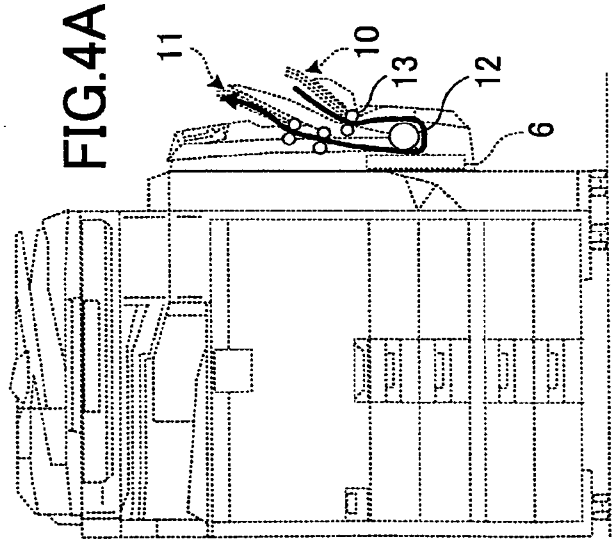
FIG. 4A shows a first state of an original manuscript sheet in an ejection path in the lateral unit in the case of a both-side reading.

With reference to FIGS. 4A through 4E, a sheet ejection path in the case of a both-side reading of the original manuscript sheet is described. First, as in the case of the one-side reading, one side of the original manuscript is read by the second scanner 6 and the information that is read is rendered into electronic information, in the first state (FIG. 4A).

Then, as shown in FIG. 4B, the original manuscript is transported by the third ejection roller pair 15 in the opposite direction and then the sides of the sheet are reversed by the second ejection roller pair 14, in the second state. The original manuscript is further sent to the original manuscript second position 11, in the third state (FIG. 4C). This is followed by the fourth state, in which the original manuscript is sent in the reverse direction via the third ejection roller pair 15 and the second ejection roller pair 14 to the ejection roller 12 (FIG. 4D), where the original manuscript sheet is read by the second scanner 6 on the opposite side, and the information that is read is rendered into electronic information.

Finally, in the fifth state, the original manuscript is transported via the ejection roller 12, the second ejection roller pair 14, and the third ejection roller pair 15 to the second position 11 (FIG. 4E).

Figure 5A:
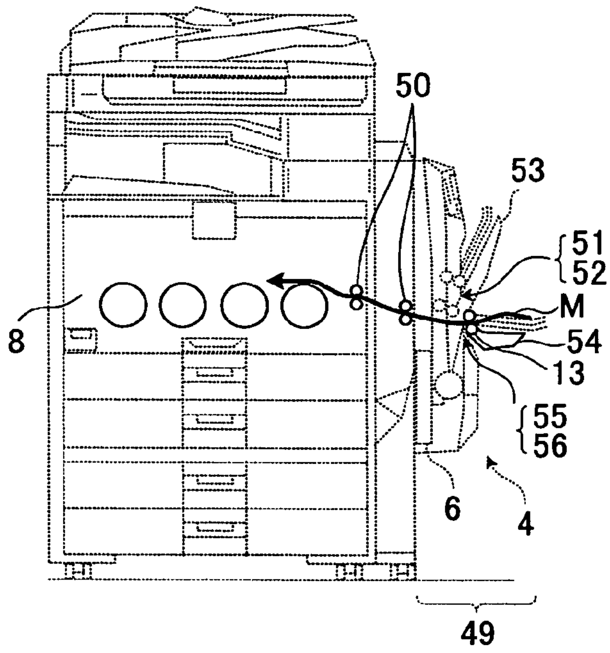
FIG. 5A shows a transport path M for the manual feeding of a transfer sheet.
Figure 5B:
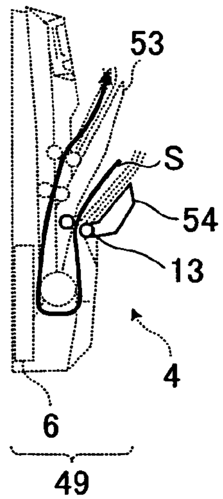
FIG. 5B shows a transport path S for the reading of an original manuscript sheet.
Figure 6:
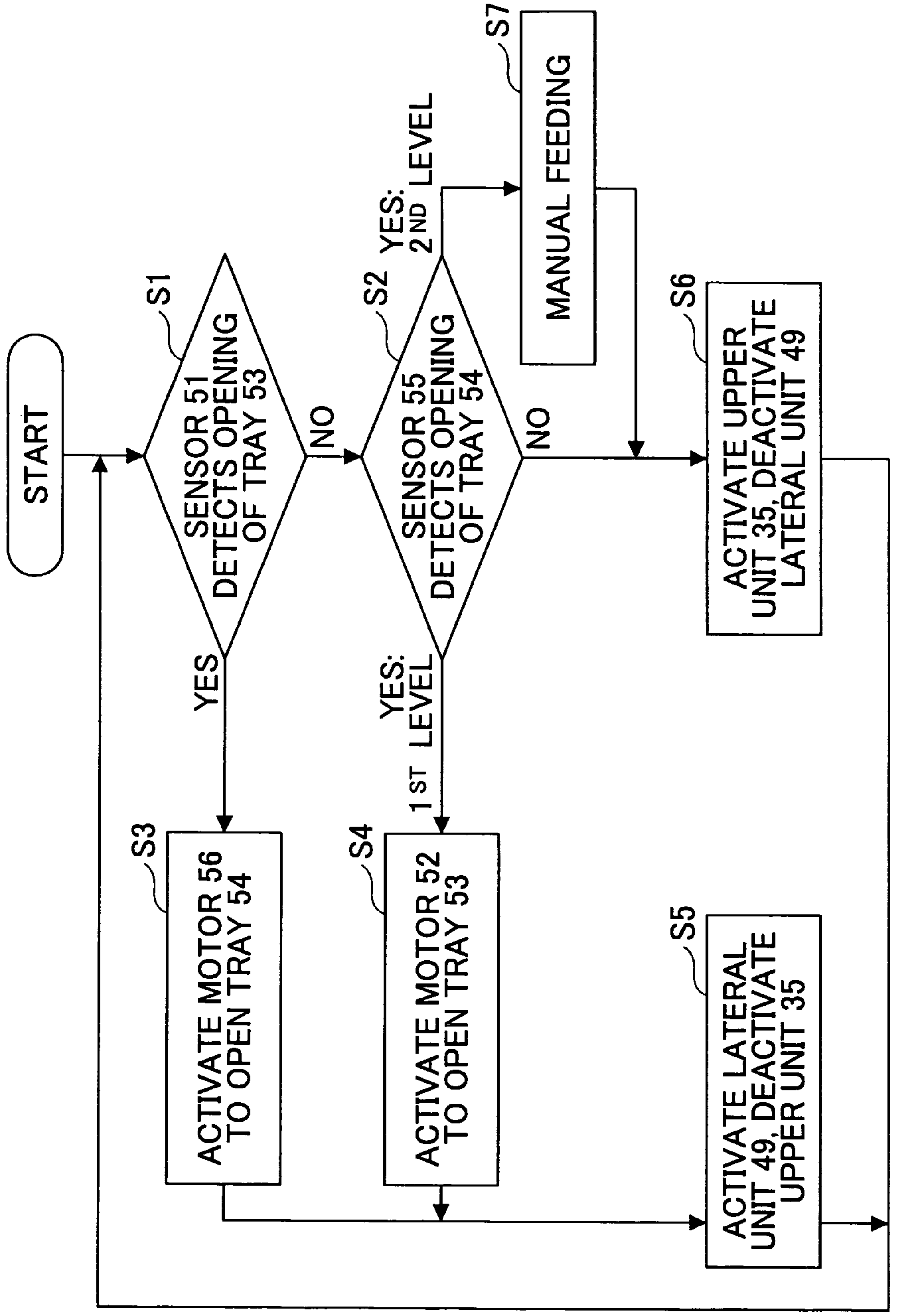
FIG. 6 shows a flowchart of an operation of the image forming apparatus according to the present embodiment.

With reference to FIGS. 5A and 5B, the simultaneous opening and closing of the two or more sheet trays 53 and 54 in the lateral unit 49, and an example of a manual feeding operation, are described. FIG. 6 shows a flowchart of the operations of FIGS. 5A and 5B.

The flowchart of FIG. 6 is described with reference to FIGS. 5A and 5B. In the lateral unit 49, upon detection by a sensor 51 (or 55) of the opening of one of the sheet trays 53 (or 54) in S1 (or S2), the motor 56 (or 52) is activated to open the sheet tray 54 (or 53) in S3 (or S4), thus opening all of the trays 53 and 54.

In order to prevent an erroneous operation, upon detection of opening of the sheet trays 53 and 54 by the sensors (51 or 55), the upper unit 35 is deactivated and disabled, assuming that the upper unit 35 (including ADF 1, operating panel 2, and scanner 3) is not going to be used, while the lateral unit 49 (including second ADF 4, second operating panel 5, and second scanner 6) alone is activated and enabled (S5).

Conversely, upon detection of the closing of the sheet trays 53 and 54 (by sensor 51 or 55) in step S1 or S2, because the lateral unit 49 is not going to be used, the lateral unit 49 is disabled and deactivated while the upper unit 35 alone is activated and made operable (S6).

The angle of the sheet tray 54 and the first ejection roller pair 13 may be varied in two levels in order to distinguish between the feeding of an original manuscript sheet for image reading and the manual feeding of a transfer sheet for image formation. Specifically, the manual feeding is selected when the sheet tray 54 and the first ejection roller pair 13 are both open and set at the lower angle facing downward, as shown in FIG. 5A (corresponding to "Yes: $2^{nd}$ level" in S2). In this case, the manual feeding transport path M extends along the fourth ejection roller pair 50 in the apparatus main body onto the printer 8 (S7).

FIG. 5B, on the other hand, shows the original manuscript sheet transport path S that is selected when the sheet tray 54 and the first ejection roller pair 13 are open and in a first level facing upward, as also shown in FIG. 4.

When it is detected by the sheet tray sensor 51 that the sheet tray 53 is open upon detection by the sheet tray sensor 55 that the sheet tray 54 is in the second level for manual feeding of a transfer sheet, the sheet tray motor 52 is activated to close the sheet tray 53.

Figure 7:
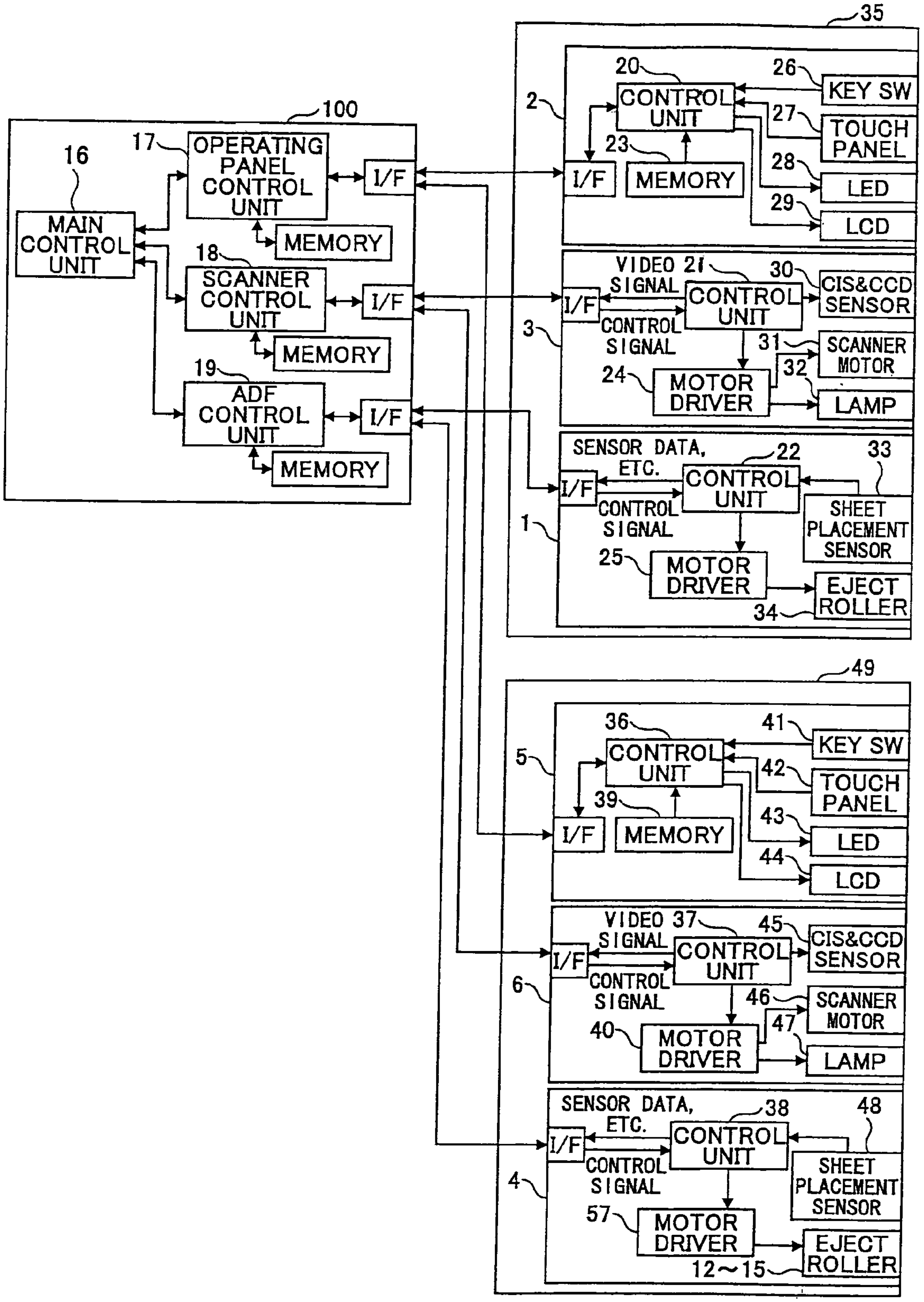
FIG. 7 shows a control block diagram of the image forming apparatus according to the present embodiment.

FIG. 7 shows a control block diagram of the image forming apparatus 100 according to the present embodiment. As shown in FIG. 7, upon detection that an original manuscript sheet is placed on a sheet position sensor 33 in the ADF 1 in the upper unit 35, a message is displayed on a Liquid Crystal Display (LCD) 44 on the second operating panel 5 of the other unit, i.e., the lateral unit 49, indicating that the second ADF 4 and the second scanner 6 are disabled. Entry of data on a key switch 41 and a touch panel 42 in the second operating panel 5 is invalidated.

Conversely, upon detection that an original manuscript sheet is placed on a sheet position sensor 48 in the second ADF 4 in the lateral unit 49, a message is displayed on an LCD 29 of an operating panel 2 of the other unit, i.e., the upper unit 35, that the ADF 1 and the scanner 3 are disabled. Entry of data on a key switch 26 and a touch panel 27 in the operating panel 2 is invalidated.

A main body control unit 16 of the image processing apparatus 100 communicates with a control unit 20 of the operating panel 2 of the upper unit 35 via an operating panel control unit 17 as follows.

The operating panel 2 includes the control unit 20, a memory unit 23, the key switch 26, the touch panel 27, a Light Emitting Diode (LED) 28, and the LCD 29. The key switch 26, which includes a hard key using a key matrix, and the touch panel 27, which includes a soft key, provide operating buttons for the input of various information. The LED 28 and the LCD 29 are used for displaying operating states or instructions from a device. The control unit 20 of the operating panel 2 controls the aforementioned individual units centrally. The control unit 20 also communicates with the memory unit 23 or the operating panel control unit 17 on the main body side to exchange input information or display data.

The main body control unit 16 of the image processing apparatus 100 communicates with a control unit 21 in a scanner 3 of the upper unit 35 via a scanner control unit 18 as follows.

The scanner 3 includes a lamp 32 as a light source required for reading an image, a contact image sensor (CIS)/charge coupled device (CCD) sensor 30, a scanner motor 31 for operating the CIS/CCD sensor 30, and a motor driver 24 for driving the scanner motor 31. The scanner control unit 18 outputs a control signal to the motor driver 24, whereby the scanner motor 31 and the lamp 32 are operated. The CIS/CCD sensor 30 provides image data that is fed to the control unit 21. The control unit 21 renders the image data into a video signal that is eventually transmitted to the main body control unit 16.

The main body control unit 16 of the image processing apparatus communicates with a control unit 22 in the ADF 1 via an ADF control unit 19 as follows.

The ADF 1 includes the control unit 22, the sheet position sensor 33, an ejection roller 34, and a motor driver 25 for driving the ejection roller 34. Upon detection of placement of a sheet on the sheet position sensor 33, the control unit 22 sends relevant information to the main body control unit 16 and thereafter receives from the main body control unit 16 an operation signal for the ejection roller 34. The control unit 22 then sends a signal to the motor driver 25 to operate the ejection roller 34.

As shown in FIG. 7, the second operating panel 5 includes a control unit 36, a memory unit 39, the key switch 41, the touch panel 42, an LED 43, and the LCD 44. As also shown in FIG. 7, the second scanner 6 includes a control unit 37, a motor driver 40, a CIS/CCD sensor 45, a scanner motor 46, and a lamp 47. Additionally, as shown in FIG. 7, the second ADF 4 includes a control unit 38, a motor driver 57, the sheet position sensor 48, the ejection roller 12, and the first through third ejection roller pairs 13, 14, and 15.

In the present embodiment, because the operating panels, the scanners, and the ADFs are provided at the two locations, i.e., in the upper unit 35 and in the lateral unit 49, it is necessary to recognize and save information about individual states of each device in those units. Thus, in the main body of the image forming apparatus 100, a memory unit is provided for each of the operating panel control unit 17, the scanner control unit 18, and the ADF control unit 19. In this way, the operating panels, the scanners, and the ADFs at the two locations can communicate with the individual control units in the main body and information about individual states can be saved in the individual memory units.

Each of the control units in the main body and the main body control unit 16 may communicate with each other in the same way as if the operating panels, the scanners, and the ADFs were provided at one location. The configuration of each of the scanners, the operating panels, and the ADFs may be the same as in an existing system.

Thus, in accordance with the present embodiment, by providing the lateral unit 49 (including the second ADF 4, the second operating panel 5, and the second scanner 6) on the side of the apparatus main body, enhanced operability at a lower position can be achieved without adversely affecting the manual feeding function. The present embodiment thus provides an image forming apparatus that can be easily operated by a user on a wheel chair or with a small height.

The image forming apparatus according to the present embodiment includes a second image reading unit disposed on the side of the apparatus main body. Thus, enhanced operability can be obtained at a lower position without adversely affecting the manual feeding function, thereby facilitating operations by a person on a wheel chair or with a small height. The present embodiment therefore provides an image forming apparatus that is friendly to various kinds of users and offers enhanced convenience.

Although this invention has been described in detail with reference to certain embodiments, variations and modifications exist within the scope and spirit of the invention as described and defined in the following claims.

The present application is based on the Japanese Priority Application No. 2007-228874 filed Sep. 4, 2007, the entire contents of which are hereby incorporated by reference.

What is claimed is:

1. An image forming apparatus, comprising:

a first image reading unit at an upper portion of a main body of the image forming apparatus; and a second image reading unit at a lateral portion of the main body of the image forming apparatus;

wherein the first image reading unit includes a first operating part and a first sheet position sensor, wherein the second image reading unit includes a second operating part and a second sheet position sensor, wherein when the first sheet position sensor detects a first original manuscript sheet, input operation to the second operating part is invalidated, the second image reading unit is disabled, and the second operating part displays a message indicating that the second image reading unit is disabled, wherein when the second sheet position sensor detects a second original manuscript sheet, input operation to the first operating part is invalidated, the first image reading unit is disabled, and the first operating part displays a message indicating that the first image reading unit is disabled, wherein the second image reading unit further includes a unit configured to establish a first state for transporting the second original manuscript sheet for image reading, and a second state for transporting a transfer sheet that is manually fed for image formation by the main body of the image forming apparatus, wherein the second image reading unit has an automatic transport function for transporting the second original manuscript sheet for the image reading, and includes a first tray unit for placing the second original manuscript sheet prior to the image reading and a second tray unit into which the second original manuscript sheet is ejected after the image reading, wherein the first and second tray units are configured to be set in a stored state, in which the first and second tray units are closed toward a surface of the main body of the image forming apparatus on which the second image reading unit is mounted, or in an image-reading state, in which the first and second tray units are opened away from the mounted surface, and wherein the first tray unit is configured to be set in a third state, in which a position of the first tray unit differs from the position of the first tray unit in either the stored state or the image-reading state, for transporting the transfer sheet that is manually fed.

2. The image forming apparatus according to claim 1, wherein the first and second tray units are configured to open or close in a corresponding manner.

3. The image forming apparatus according to claim 1, wherein the first operating part is configured to exchange first information with the main body of the image forming apparatus, and wherein the second operating part is configured to exchange second information with the main body of the image forming apparatus.

4. The image forming apparatus according to claim 3, wherein the first and second operating parts are configured to be operated in a mutually exclusive manner depending on an operating status of the first and second image reading units.

5. The image forming apparatus according to claim 3, wherein when the first tray unit and the second tray unit are closed, the first operating part is activated and the second operating part is deactivated, and wherein when at least one of the first and second tray units is opened, the second operating part is activated and the first operating part is deactivated.

6. The image forming apparatus according to claim 1, wherein the second image reading unit is configured for single-sided and double-sided reading of the second original manuscript sheet.

7. The image forming apparatus according to claim 1, wherein when one of the first and second tray units is opened or closed, the other of the first and second tray units is automatically respectively opened or closed.

8. The image forming apparatus according to claim 1, wherein the second image reading unit is configured for single-sided reading of the second original manuscript sheet.

9. The image forming apparatus according to claim 1, wherein the second image reading unit is configured for double-sided reading of the second original manuscript sheet.

10. The image forming apparatus according to claim 1, wherein the first operating part is configured to exchange information with the main body of the image forming apparatus.

11. The image forming apparatus according to claim 1, wherein the second operating part is configured to exchange information with the main body of the image forming apparatus.

12. The image forming apparatus according to claim 1, wherein the first and second tray units are configured to open and close in a corresponding manner.

13. The image forming apparatus according to claim 1, wherein when one of the first and second tray units is opened, the other of the first and second tray units is automatically opened.

14. The image forming apparatus according to claim 1, wherein when one of the first and second tray units is closed, the other of the first and second tray units is automatically closed.

15. An image forming method, comprising:

allowing input operation to a first operating part of a first image reading unit when a second sheet position sensor of a second image reading unit does not detect a second original manuscript sheet;

allowing input operation to a second operating part of the second image reading unit when a first sheet position sensor of the first image reading unit does not detect a first original manuscript sheet;

establishing a first state for transporting the second original manuscript sheet; and establishing a second state for transporting a transfer sheet that is manually fed for image formation by the second image reading unit;

wherein when the first sheet position sensor detects the first original manuscript sheet, input operation to the second operating part is invalidated, the second image reading unit is disabled, and the second operating part displays a message indicating that the second image reading unit is disabled, and wherein when the second sheet position sensor detects the second original manuscript sheet, input operation to the first operating part is invalidated, the first image reading unit is disabled, and the first operating part displays a message indicating that the first image reading unit is disabled, wherein the second image reading unit has an automatic transport function for transporting the second original manuscript sheet for the image reading, and includes a first tray unit for placing the second original manuscript sheet prior to the image reading and a second tray unit into which the second original manuscript sheet is ejected after the image reading, wherein the first and second tray units are configured to be set in a stored state, in which the first and second tray units are closed toward a surface of a main body of the image forming apparatus on which the second image reading unit is mounted, or in an image-reading state, in which the first and second tray units are opened away from the mounted surface, and wherein the first tray unit is configured to be set in a third state, in which a position of the first tray unit differs from the position of the first tray unit in either the stored state or the image-reading state, for transporting the transfer sheet that is manually fed.

16. The image forming method according to claim 15, further comprising:

exchanging first information of the first operating part with the apparatus main body, and exchanging second information of the second operating part with the apparatus main body.

17. The image forming method according to claim 15, further comprising:

operating the first and second operating parts in a mutually exclusive manner depending on an operating status of the first and second image reading units.

18. The image forming method according to claim 15, further comprising:

performing single-sided and double-sided reading of the second original manuscript sheet with the second image reading unit.

19. An image forming apparatus, comprising:

a first image reading unit at an upper portion of a main body of the image forming apparatus; and a second image reading unit at a lateral portion of the main body of the image forming apparatus;

wherein the first image reading unit includes a first operating part and a first sheet position sensor, wherein the second image reading unit includes a second operating part and a second sheet position sensor, wherein when the first sheet position sensor detects a first original manuscript sheet, the second image reading unit is disabled, and the second operating part displays a message indicating that the second image reading unit is disabled, wherein when the second sheet position sensor detects a second original manuscript sheet, the first image reading unit is disabled, and the first operating part displays a message indicating that the first image reading unit is disabled, wherein the second image reading unit further includes a unit configured to establish a first state for transporting the second original manuscript sheet for image reading, and a second state for transporting a transfer sheet that is manually fed for image formation by the main body of the image forming apparatus, wherein the second image reading unit has an automatic transport function for transporting the second original manuscript sheet for the image reading, and includes a first tray unit for placing the second original manuscript sheet prior to the image reading and a second tray unit into which the second original manuscript sheet is ejected after the image reading, wherein the first and second tray units are configured to be set in a stored state, in which the first and second tray units are closed toward a surface of the main body of the image forming apparatus on which the second image reading unit is mounted, or in an image-reading state, in which the first and second tray units are opened away from the mounted surface, and wherein the first tray unit is configured to be set in a third state, in which a position of the first tray unit differs from the position of the first tray unit in either the stored state or the image-reading state, for transporting the transfer sheet that is manually fed.

* * * * *